United States Patent
Pou et al.

(10) Patent No.: US 10,870,789 B2
(45) Date of Patent: *Dec. 22, 2020

(54) COMPOSITION FOR LIMITING THE FORMATION AND/OR AGGLOMERATION OF GAS HYDRATES

(71) Applicant: Arkema France, Colombes (FR)

(72) Inventors: Tong Eak Pou, Irigny (FR); Frédéric Moser, Pierre-Benite (FR); Gilles Barreto, Messimy (FR); Jean-Philippe Gillet, Brignais (FR)

(73) Assignee: ARKEMA FRANCE, Colombes (FR)

( * ) Notice: Subject to any disclaimer, the term of this patent is extended or adjusted under 35 U.S.C. 154(b) by 175 days.

This patent is subject to a terminal disclaimer.

(21) Appl. No.: 15/778,926

(22) PCT Filed: Nov. 25, 2016

(86) PCT No.: PCT/FR2016/053093
§ 371 (c)(1),
(2) Date: May 24, 2018

(87) PCT Pub. No.: WO2017/089724
PCT Pub. Date: Jun. 1, 2017

(65) Prior Publication Data
US 2018/0346790 A1 Dec. 6, 2018

(30) Foreign Application Priority Data
Nov. 27, 2015 (FR) ..................... 15 61489

(51) Int. Cl.
*C09K 8/524* (2006.01)
*C09K 8/52* (2006.01)

(52) U.S. Cl.
CPC ............. *C09K 8/524* (2013.01); *C09K 8/52* (2013.01); *C09K 2208/22* (2013.01)

(58) Field of Classification Search
None
See application file for complete search history.

(56) References Cited

U.S. PATENT DOCUMENTS

| | | | |
|---|---|---|---|
| 5,900,516 A * | 5/1999 | Talley | C09K 8/52 137/13 |
| 7,381,689 B2 | 6/2008 | Panchalingam et al. | |
| 2003/0013614 A1* | 1/2003 | Klug | C09K 8/52 507/200 |
| 2012/0157351 A1 | 6/2012 | Webber | |
| 2012/0161070 A1 | 6/2012 | Webber et al. | |
| 2014/0216748 A1* | 8/2014 | Pou | C09K 8/528 166/305.1 |
| 2018/0346790 A1* | 12/2018 | Pou | C09K 8/52 |

FOREIGN PATENT DOCUMENTS

| FR | 2979632 A1 | 3/2013 |
|---|---|---|
| WO | 9424413 A1 | 10/1994 |
| WO | 9519408 A1 | 7/1995 |
| WO | 2014105764 A1 | 7/2014 |

OTHER PUBLICATIONS

International Search Report and Written Opinion for International Application No. PCT/FR2016/053093, dated Mar. 31, 2017, 7 pages.
Zanota et al., Energy & Fuel, 2005, 19(2), pp. 584-590.

* cited by examiner

Primary Examiner — John J Figueroa
(74) Attorney, Agent, or Firm — RatnerPrestia

(57) ABSTRACT

Provided is a composition that includes (i) at least one compound represented by formula (I) as defined herein or a salt thereof and (ii) a nonionic surfactant. The composition is useful for limiting or preventing the formation and/or agglomeration of gas hydrates, by combining the composition and a production fluid that includes an aqueous phase and one or more gases.

17 Claims, No Drawings

COMPOSITION FOR LIMITING THE FORMATION AND/OR AGGLOMERATION OF GAS HYDRATES

CROSS-REFERENCE TO RELATED APPLICATIONS

This is the national phase of International Application No. PCT/FR2016/053093, filed on 25 Nov. 2016, which claims priority to French Application No. 15-61489, filed 27 Nov. 2015. The disclosure of each of these applications is incorporated herein by reference in its entirety for all purposes.

FIELD OF THE INVENTION

The present invention relates to a composition comprising one or more carboxylic amino acids of particular structure and one or more nonionic surfactants.

The present invention also relates to a process for limiting, or even preventing, the formation and/or agglomeration of gas hydrates, using a composition as defined previously.

BACKGROUND OF THE INVENTION

Finally, the present invention also relates to the use of a composition as defined previously for limiting, or even preventing, the formation and agglomeration of gas hydrates.

Petroleum and/or gas and/or condensates are produced in various environments, and especially in offshore sites and/or in sites that are subject to cold meteorological periods, which leads to substantial cooling of the fluids produced on contact with the cold walls of the transportation pipes.

SUMMARY OF THE INVENTION

The term "fluids produced" means fluids comprising petroleum, gases, condensates, water and mixtures thereof.

For the purposes of the present invention, the term "petroleum" means crude oil, i.e. unrefined oil, originating from an oilfield.

For the purposes of the present invention, the term "gas" means crude natural gases, i.e. untreated gases, extracted directly from a gasfield, for instance hydrocarbons such as methane, ethane, propane or butane, hydrogen sulfide, carbon dioxide and other compounds that are gaseous under the exploitation conditions, and also mixtures thereof. The composition of the natural gas extracted varies considerably depending on the well. Thus, the gas may comprise gaseous hydrocarbons, water and other gases.

For the purposes of the present invention, the term "condensates" means hydrocarbons of intermediate density. The condensates generally comprise mixtures of hydrocarbons, which are liquid under the exploitation conditions.

It is known that these production fluids, or fluids produced, usually comprise an aqueous phase. The origin of this aqueous phase may be endogenous and/or exogenous to the underground reservoir containing the hydrocarbons, the exogenous aqueous phase generally originating from injection of water (injection water).

The depletion of the old sites discovered is nowadays leading the petroleum and gas industry to perform production, especially on new sites, often with increasingly great depths for the offshore sites and with ever more extreme meteorological conditions.

On offshore sites, the pipes for transporting the fluids produced, especially on the seabed, are increasingly deep, reaching depths where the seawater is at temperatures below 15° C., below 10° C., or even close or equal to 4° C.

Similarly, on sites located in certain geographical zones, the air or the surface water may be cold, typically below 15° C., or below 10° C. Now, at such temperatures, the fluids produced undergo substantial cooling during their transportation. This cooling may be further amplified in the case of stoppage or a slowdown in production, in which cases the contact time between the fluids produced and the cold walls of the pipe increases.

When the temperature of the fluids produced drops, the industry concerned with extracting these fluids is commonly confronted with the formation of clathrates, also known as hydrate crystals, gas hydrates or quite simply hydrates. The risk for the industry concerned with extracting these fluids and especially concerned with petroleum, gas and condensate extraction is proportionately greater the lower the temperature of the production fluids and the higher the pressure of these fluids.

These problems of formation and/or agglomeration of hydrates may also be encountered in drilling muds or in completion fluids, during a drilling operation or a completion operation.

These clathrates are solid crystals (similar to ice crystals) formed by water molecules, also referred to as the "receiver", around one or more gas molecules, also referred to as the "guests", such as methane, ethane, propane, butane, carbon dioxide or hydrogen sulfide.

The formation and growth of hydrate crystals, induced by a lowering of the temperature of the production fluids, which emerge hot from the geological reservoir which contains them and which enter a cold zone, may cause clogging or blocking of the production pipes, the hydrocarbon (petroleum, condensate or gas) transportation pipes, or gate valves, flap valves and other elements liable to become totally or at least partially blocked. These cloggings/blockages may lead to losses of production of petroleum, condensates and/or gas, entailing appreciable or even very substantial economic losses. The reason for this is that the consequence of these cloggings and/or blockages will be a decrease in the production flow rate, or even stoppage of the production unit. In the event of a blockage, the consequence of searching for the zone of the blockage and removal of said blockage will be a loss of time and of profit for this unit. These cloggings and/or blockages may also lead to malfunction in safety elements (for example safety gate valves).

To reduce, delay or inhibit the formation and/or agglomeration of hydrates, various solutions have already been proposed or envisaged. Among these, mention may be made especially of a first solution which consists in dehydrating the crude oil or the gas upstream of the zone of the pipe where the temperature promotes the formation of these hydrates. This solution is, however, difficult or even impossible to implement under satisfactory economic conditions.

A second approach, which is also very expensive, consists in maintaining the temperature of the pipe at a temperature above the temperature of formation and/or agglomeration of hydrates, at a given pressure.

A third approach, which is frequently used, consists in adding a thermodynamic anti-hydrate, for example methanol or glycol, to the fluids produced containing the water/guest gas mixture to shift the equilibrium temperature for the formation of hydrates. In order to obtain acceptable efficacy, about 30% by weight of alcohol, relative to the amount of water, is generally introduced. However, the toxicity of methanol and the large amount of alcohol used are increasingly leading industrialists to adopt a fourth approach.

This fourth solution consists in adding an additive in low dosage, known as a low dosage hydrate inhibitor (LDHI) into the fluids produced comprising the water/guest gas mixture. This additive is also known as an anti-hydrate and is introduced at a low dosage, generally between 1% and 4% by weight, relative to the weight of water, it being understood that larger or smaller amounts are, of course, possible. Two types of anti-hydrate additives are currently known: anti-agglomerants and kinetic anti-hydrates The formation of hydrates depends mainly on the temperature and the pressure, and also on the composition of the guest gas(es). To be able to compare the performance of additives, the notion of subcooling value is used. The subcooling (SC) value is thus defined as the difference between the temperature of the fluids produced (or exploitation temperature T) and the thermodynamic equilibrium temperature of formation of the hydrate crystals (Teq) for a given pressure and a given composition of the hydrate-forming gases and of the aqueous phase, according to the following equation: SC=T−Teq.

When the subcooling value is less than or equal to 0° C., there is a risk of formation of gas hydrate.

Kinetic anti-hydrates act on the seeding and growth of the hydrate crystals. They retard the formation of hydrates by several hours, or even several days.

However, this type of hydrate inhibitor acts with difficulty at subcooling (SC) values below −10° C. for a given pressure. In other words, the time for appearance of crystals under these conditions is short enough for them to appear and to increase the pressure loss in the petroleum and gas production fluid transportation pipes.

Conversely, anti-agglomerants do not inhibit the formation of hydrate crystals, but disperse them in the form of fine particles, known as a slurry, which consequently prevents their agglomeration. The hydrates thus dispersed give rise to less or even no clogging or blocking, as mentioned previously, thus limiting the loss of hydrocarbon production.

In contrast with kinetic anti-hydrates, anti-agglomerants make it possible to avoid the problems of blocking and/or clogging as mentioned previously at subcooling (SC) values of the order of −15° C. to −20° C. for a given pressure, but are less efficient or even lose their efficiency at even lower subcooling values.

For example, US 2012/0161070 proposes anti-agglomerant chemical compositions. However, the tests performed are limited to a subcooling value of −17° C. Furthermore, the synthesis of these surfactants requires four reaction steps, if the steps for obtaining the fatty amine from the renewable starting material consisting of fatty acid are also counted. Limiting the number of synthetic steps is important for limiting the cost, the losses of yield, the waste and the quality problems.

US 2012/0157351 also proposes anti-agglomerant chemical compositions. However, the tests performed are limited to a subcooling value of −17° C. and the other chemical compositions proposed are not efficient for dispersing hydrates with a subcooling value of −20° C.

DETAILED DESCRIPTION OF THE INVENTION

Given the exploitation medium (oceans, seas), it is increasingly common for anti-agglomerants also to have to have low ecotoxicity, satisfactory biodegradability and low bioaccumulation. According to the recommendations of the CEFAS (Centre for Environment, Fisheries and Aquaculture Science) in accordance with the OSPAR (Oslo-Paris Commission), in order for an additive to be green, i.e. environmentally compatible, it needs to meet two of the following three conditions:

1) have an ecotoxicity (LC50 (lethal effects) and EC50 (toxic effects)) of greater than 10 mg·L$^{-1}$;
2) have a biodegradability (OCDE 306) in marine medium of greater than 60%; and
3) have a bioaccumulation (Log Pow) (OCDE 117) of less than or equal to 3 or its molar mass greater than 700 g·L$^{-1}$.

Other countries also impose two of these three conditions for additives used in petroleum and gas production, for instance corrosion inhibitors, kinetic anti-hydrates, anti-agglomerants, mineral deposit inhibitors, de-emulsifiers, deoilers, antifoam additives, paraffin inhibitors and dispersants, asphaltene inhibitors and dispersants, and hydrogen sulfide scavengers.

A real need consequently remains to develop an anti-agglomerant which is easy to manufacture in a low number of synthetic steps and readily industrializable, while at the same time complying with the recommendations of CEFAS or, at the very least, at least one (1), preferably at least two (2), more preferably three (3) of the environmental conditions mentioned above, and which is efficient for a subcooling value of less than or equal to −20° C., i.e. for a temperature difference between the extraction temperature, or exploitation temperature, and the thermodynamic equilibrium temperature at which hydrate crystals form, of less than or equal to −20° C.

The Applicant has now discovered, surprisingly, that a composition comprising one or more carboxylic amino acids of particular structure and one or more nonionic surfactants makes it possible to satisfy the objectives defined above A first subject of the present invention is thus a composition comprising:
(i) one or more compounds of formula (I), and salts thereof:

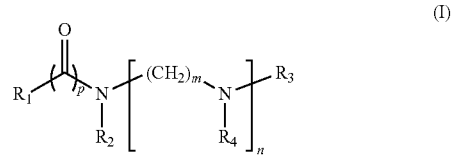

(I)

in which:
R$_1$ represents a linear or branched, saturated or unsaturated C$_6$ to C$_{30}$ alkyl chain, said chain also possibly being interrupted with one or more hydrocarbon-based rings, R$_2$ represents a hydrogen atom or a group —(CHR$_a$—CHR$_b$)—COOR$_5$, with R$_a$ and R$_b$, which may be identical or different, representing, independently of each other, a hydrogen atom or a methyl group, R$_3$ represents a hydrogen atom or a group —(CHR$_a$—CHR$_b$)—COOR$_6$, with R$_a$ and R$_b$, which may be identical or different, representing, independently of each other, a hydrogen atom or a methyl group, R$_4$ represents a hydrogen atom or a group —(CHR$_a$—CHR$_b$)—COOR$_7$, with R$_a$ and R$_b$, which may be identical or different, representing, independently of each other, a hydrogen atom or a methyl group, R$_5$, R$_6$ and R$_7$, which may be identical or different, representing, independently of each other, a hydrogen atom or a linear or branched, saturated or unsaturated C$_1$ to C$_{12}$ alkyl chain, it being understood that at least one of the radicals $R_2$, $R_3$ or $R_4$ comprises a carboxylic acid function (—COOH), m represents an integer ranging from 1 to 6, and n represents an integer ranging from 0 to 10, and p is equal to 0 or 1 and preferably p is equal to 0, and (ii) one or more nonionic surfactants.

The composition according to the invention prevents or limits the agglomeration of gas hydrates and remains efficient for subcooling values of less than or equal to −20° C. It makes it possible especially to work at lower temperatures than the current temperatures while at the same time increasing the fluid hydrocarbon extraction yield, and to facilitate the completion or drilling at low temperatures and high pressures while limiting the impact on the environment.

Thus, the composition according to the invention is an anti-hydrate formulation and, more specifically, the present invention relates to a formulation that is capable of preventing or limiting the agglomeration of gas hydrates, said formulation comprising:

(i) one or more compounds of formula (I) as defined above, and salts thereof, and (ii) one or more nonionic surfactants.

Moreover, the preparation of the carboxylic amino acid of formula (I) requires few synthetic steps and is thus readily industrializable with relatively low manufacturing costs.

A subject of the present invention is also a process for limiting or even preventing the formation and/or agglomeration of gas hydrates, comprising a step of adding a composition as defined above to a production fluid comprising an aqueous phase and one or more gases.

Finally, the present invention relates to the use of a composition as defined above for limiting or even preventing the formation and/or agglomeration of gas hydrates, and preferably in a process for extracting petroleum and/or gas and/or condensates.

In the text hereinbelow, unless otherwise indicated, the limits of a range of values are included in that range, especially in the expressions "between" and "ranging from . . . to . . . ".

Other subjects, characteristics, aspects and advantages of the invention will become even more clearly apparent on reading the description and examples which follow.

The Composition

The Compound of Formula (I)

The composition according to the present invention comprises one or more compounds of formula (I) as defined above.

Preferably, m is an integer ranging from 2 to 4, and more preferentially, m is equal to 2 or 3.

Preferably, n is an integer ranging from 0 to 4, and more preferentially, n is equal to 0, 1 or 2.

Preferably, all the radicals $R_a$ and $R_b$ are identical or different, and more preferentially, all the radicals $R_a$ are identical and all the radicals $R_b$ are identical. Better still, all the radicals $R_a$ and $R_b$ are identical and, entirely preferably, all the radicals $R_a$ and $R_b$ each represent a hydrogen atom.

According to a first preferred embodiment of the invention, p is equal to 0, $R_2$ represents a group —$(CH_2)_2$—$COOR_5$, $R_3$ represents a group —$(CH_2)_2$—$COOR_6$ and $R_4$ represents a group —$(CH_2)_2$—$COOR_7$, with $R_5$, $R_6$ and $R_7$, which may be identical or different, representing, independently of each other, a hydrogen atom or a linear or branched, saturated or unsaturated $C_1$ to $C_{12}$ alkyl chain, at least one of the radicals $R_5$, $R_6$ and $R_7$ representing a hydrogen atom.

More particularly, $R_5$, $R_6$ and $R_7$ are identical and each represent a hydrogen atom.

According to a second advantageous embodiment of the invention, n is equal to 0 and p is equal to 0, $R_1$ represents a linear or branched, saturated or unsaturated $C_8$ to $C_{18}$, preferably $C_{10}$ to $C_{18}$ and more preferentially $C_{12}$ to $C_{18}$ alkyl chain, $R_2$ represents a hydrogen atom, $R_3$ represents a group —$(CHR_a$—$CHR_b)$—$COOR_6$, with $R_a$ and $R_b$, which may be identical or different, representing, independently of each other, a hydrogen atom or a methyl group, $R_a$ and $R_b$ preferably being identical and each representing a hydrogen atom, and $R_6$ representing a hydrogen atom.

According to a third advantageous embodiment of the invention, p is equal to 0, n is equal to 0, $R_1$ represents a linear or branched, saturated or unsaturated $C_8$ to $C_{18}$, preferably $C_{10}$ to $C_{18}$ and more preferentially $C_{12}$ to $C_{18}$ alkyl chain, $R_2$ represents hydrogen or a group —$(CHR_a$—$CHR_b)$—$COOR_5$, with $R_a$ and $R_b$, which may be identical or different, representing, independently of each other, a hydrogen atom or a methyl group, $R_a$ and $R_b$ preferably being identical and each representing a hydrogen atom, and $R_5$ representing a hydrogen atom, $R_3$ represents a group —$(CHR_a$—$CHR_b)$—$COOR_6$, with $R_a$ and $R_b$, which may be identical or different, representing, independently of each other, a hydrogen atom or a methyl group, $R_a$ and $R_b$ preferably being identical and each representing a hydrogen atom, and $R_6$ representing a hydrogen atom.

According to one embodiment, when p is equal to 1, then $R_2$ represents a hydrogen atom and, preferably, n is other than zero (0).

According to a fourth advantageous embodiment of the invention, $R_1$ represents an alkyl chain, as defined above, i.e. a linear or branched, saturated or unsaturated $C_6$ to $C_{30}$ alkyl chain, interrupted with one or more —C(=O)—NH— divalent groups, the divalent group preferably possibly not being in the end position of the alkyl chain. Preferably, the alkyl chain is interrupted with a —C(=O)—NH— divalent group.

The salts of the compounds of formula (I) that may be used according to the present invention may especially be carboxylate anions and/or cations on the nitrogen atom(s).

The counterions of these salts may be, for example and in a nonlimiting manner, alkali metal (for example sodium or potassium) ions, alkaline-earth metal (for example calcium or magnesium) ions, ammoniums, phosphoniums, halides (for example chloride, bromide or iodide), sulfate, hydrogen sulfate, mesylate, carboxylates, hydrogen carbonates, carbonates, phosphonates or phosphates.

The compounds of formula (I) that may be used in the context of the present invention are known and commercially available. Preferably, the compound of formula (I) may especially be N-cocoyl-β-aminopropanoic, N-cocoyl-β-aminodipropanoic, and mixtures thereof, N-tallow-β-aminopropanoic, N-tallow-β-aminodipropanoic, and mixtures thereof.

These compounds have the advantage of being readily synthesizable via procedures known to those skilled in the art, i.e. of being able to be obtained via a synthesis involving few steps.

The composition comprising the compound of formula (I) is used in an amount preferably ranging from 0.1% to 10% by weight, more preferentially from 0.3% to 8% by weight and better still from 0.4% to 4% by weight, relative to the total weight of the aqueous phase in a production fluid.

The content of aqueous phase may be measured on a sample of production fluid by decantation, according to the techniques known to those skilled in the art.

The Nonionic Surfactants

The composition according to the present invention also comprises one or more nonionic surfactants.

The nonionic surfactants that may be used in the composition according to the invention are advantageously chosen from esters, such as glycerol, sugars and sugar derivatives (for example sorbitol, sorbitan or isosorbide) and linear or branched, saturated or unsaturated $C_8$ to $C_{30}$, preferably $C_8$ to $C_{24}$ and more preferentially $C_{10}$ to $C_{20}$ acids, alkoxylated (for example ethoxylated) fatty acids and alkoxylated fatty alcohols (for example ethoxylated fatty alcohols, for instance ethoxylated cardanol).

For the purposes of the present invention, the term "esters" means monoesters, diesters or triesters.

According to a preferred embodiment of the invention, the nonionic surfactant(s) are chosen from sorbitan esters, alkoxylated (for example ethoxylated) sorbitan esters, alkoxylated (for example ethoxylated) fatty acids, and alkoxylated fatty alcohols (for example ethoxylated fatty alcohols, for instance ethoxylated cardanol), each of the alkoxylated species listed previously advantageously comprising from 1 to 25 oxyethylene (OE) units.

The fatty chain(s) present on the nonionic surfactants are linear or branched, saturated or unsaturated fatty chains, and each comprise from 6 to 30 carbon atoms, preferably from 8 to 20 carbon atoms.

More particularly, the nonionic surfactant(s) present in the composition according to the invention are advantageously chosen from sorbitan monolaurate, sorbitan monopalmitate, sorbitan monostearate, sorbitan monooleate, sorbitan sesquioleate, sorbitan trioleate and sorbitan isostearate, and mixtures thereof, and preferably from sorbitan monolaurate and sorbitan monostearate, and mixtures thereof.

As examples of commercial products that may be used mention may be made especially of the products sold by the company Croda under the name Span 20® (sorbitan monolaurate) or Span 60® (sorbitan monostearate).

The total amount of the nonionic surfactant(s) present in the composition according to the invention preferably ranges from 0.5% to 15% by weight and more preferentially from 1% to 10% by weight, relative to the total weight of the composition.

The Organic Solvents

The composition according to the present invention may optionally also comprise one or more organic solvents.

Preferably, the organic solvent(s) present in the composition according to the invention are chosen from $C_1$ to $C_4$ lower alcohols, glycols, glycol ethers and mixtures thereof, more preferentially from methanol, ethanol, isopropanol, n-butanol, isobutanol, ethylene glycol (or monoethylene glycol), 1,2-propylene glycol, 1,3-propylene glycol, hexylene glycol, butyl glycol, ethylene glycol dibutyl ether, methyl ethyl ketone, methyl isobutyl ketone, diisobutyl ketone, N-methylpyrrolidone, cyclohexanone, xylenes, toluene, 1-octanol and 2-octanol, and mixtures of two or more thereof in all proportions. Entirely preferably, the organic solvent is a glycol or a mixture of several glycols, for example ethylene glycol, butyl glycol, and the like.

The total amount of the organic solvent(s), when they are present in the composition according to the invention, preferably ranges from 20% to 90%, preferably from 40% to 90% and more preferentially from 45% to 80% by weight, relative to the total weight of the composition.

The Additives

According to another embodiment, one or more additives that are well known to those skilled in the art may be added to the composition according to the invention. Such additives may be chosen, for example, in a nonlimiting manner, from anticorrosion agents, anti-paraffins, mineral deposit inhibitors, anti-asphaltenes, de-emulsifiers, surfactants, and the like, and mixtures thereof, as described, for example, in U.S. Pat. No. 7,381,689 and WO 2014/0105764, including cationic surfactants, for instance quaternary alkyltrimethylammonium salts, quaternary alkyldimethylbenzylammonium salts, quaternary dialkyldimethylammonium salts, alkylimidazolinium salts, alkylamines and salts thereof, alkylamido(poly)amines and salts thereof, in which alkyl- denotes a hydrocarbon-based fatty chain (typically 8 to 30 carbon atoms).

According to a most particularly preferred embodiment, the composition according to the invention does not comprise any compound comprising a piperazine unit substituted with radicals comprising alkoxylated, for example ethoxylated, fatty alkyl groups.

Process for Limiting or Even Preventing the Formation and/or Agglomeration of Gas Hydrates A subject of the present invention is also a process for limiting or even preventing the formation and/or agglomeration of gas hydrates, comprising a step of adding a composition as defined above to a production fluid comprising an aqueous phase and one or more gases.

The total content of the aqueous phase present in the production fluid is generally between 10% and 90% by weight, relative to the total weight of the production fluid, i.e. relative to the total weight of the fluids (aqueous phase and hydrocarbons).

The total content of aqueous phase defined above corresponds to the total proportion of aqueous phase initially present in the production fluid, i.e. in the initial mixture (aqueous phase and the other crude extraction liquids such as hydrocarbons, condensates, etc.).

The aqueous phase of the production fluid also comprises one or more dissolved gases that are capable of forming with water gas hydrates at a given temperature and pressure.

Some of the gases present in the aqueous phase of the production fluid are "guest" gases, as defined previously, and generally comprise methane, ethane, propane, butane, carbon dioxide, hydrogen sulfide, and mixtures thereof.

The composition according to the invention is added in an amount preferably ranging from 0.1% to 10% by weight, more preferentially from 0.3% to 8% by weight and better still from 0.4% to 4% by weight, relative to the total weight of the aqueous phase in a production fluid.

The composition may be introduced into the production fluid continuously, discontinuously, regularly or irregularly, or temporarily, in one or more portions. The composition is generally introduced upstream of the zone at risk of the presence of hydrates, whether it be at the surface, at the well head or at the well bottom.

According to an advantageous embodiment, the fluid treated with the composition according to the invention is a drilling mud or a completion fluid.

According to this embodiment, the composition is introduced into the drilling mud or into the completion fluid before or during the injection of the drilling mud or of the completion fluid.

Use of the Composition

A subject of the present invention is also the use of a composition as defined above for limiting or even preventing the formation and/or agglomeration of gas hydrates, and preferably in a process for extracting petroleum and/or gas and/or condensates.

Specifically, it has been observed, surprisingly, that the composition of the invention makes it possible to limit or even prevent the formation and/or agglomeration of gas hydrates, by means of the combined action of a compound of formula (I) which may be considered as an amphoteric surfactant, with a nonionic surfactant.

According to one embodiment, the composition according to the invention is used in an amount preferably ranging from 0.1% to 10% by weight, more preferentially from 0.3% to 8% by weight and better still from 0.4% to 4% by weight, relative to the total weight of the aqueous phase in a production fluid.

The invention will be understood more clearly in light of the examples that follow, which are given purely for illustrative purposes and which are not intended to limit the scope of the invention, defined by the attached claims.

EXAMPLES

In the examples that follow, all the amounts are indicated as weight percentages relative to the total weight of the composition, unless otherwise indicated.

I. First Series of Tests
  a) The Compositions

The comparative composition (A1) and the composition according to the invention (B) were prepared from the ingredients whose contents are indicated in the table below.

|  | Composition A1 (comparative) | Composition B (invention) |
|---|---|---|
| Noramium ® M2C [1] | 50 | — |
| Amphoram ® CP1-MEG [2] | — | 25 |
| Sorbitan monolaurate Span 20 | — | 5 |
| Butyl glycol | 50 | 70 |

[1] dicocoyldimethylammonium chloride, sold by CECA S.A.
[2] Amphoram ® CP1 (comprising N-cocoylamine, N-cocoyl-β-aminopropanoic and N-cocoyl-β-aminodipropanoic) as a mixture with monoethylene glycol (MEG) sold by CECA S.A.

b) The Protocol

The efficiencies of compositions A1 and B as anti-agglomerant were determined on a model fluid representing a production fluid comprising tetrahydrofuran (THF). THF hydrates form at atmospheric pressure and are regularly used for detecting the efficiency of compounds that are candidates as gas hydrate anti-agglomerants.

The model fluid comprises:
  50% by weight of aqueous phase consisting of a mixture of demineralized water and tetrahydrofuran (THF) in a 1:1 ratio, and
  50% by weight of isooctane.

The thermodynamic equilibrium temperature for hydrate formation of this model fluid is 2° C. at atmospheric pressure. In other words, the THF hydrates form at temperatures of less than or equal to 2° C.

The anti-agglomerant efficiency of the anti-hydrate compositions was measured at various subcooling values (−12° C. and −22° C.) and for various dosages. The dosage corresponds to the amount of anti-hydrate composition introduced into the aqueous phase of the production fluid.

The subcooling value represents the temperature difference between the exploitation, or imposed, temperature and the thermodynamic equilibrium temperature for hydrate formation of the production fluid. In other words, for a subcooling value of −12° C., the imposed temperature must be −10° C. Similarly, for a subcooling value of −22° C., the temperature must be −20° C.

The experimental device, described especially by M. L. Zanota (M. L. Zanota et al., Energy & Fuel, 2005, 19(2), (2005), 584-590), is composed of a motor which imposes an oscillating motion on a rack. The rack contains 12 borosilicate glass tubes 17 mm in diameter and 60 mm tall.

Each tube is closed and contains the mixture described above and also a 316 L stainless-steel ball 0.8 cm in diameter. The ball allows the mixture to be stirred, allows the agglomeration of the hydrate crystals to be observed visually and constitutes a crystallization initiator.

The rack is immersed in a thermostatic bath, comprising a water/ethylene glycol mixture (1/1), the temperature of which varies between −30° C. and 30° C. by means of a Huber brand variostat.

The various samples are subjected to cooling and heating cycles governed by the programmable variostat. The temperature descent rates are defined and programmed. The variostat is equipped with two temperature probes, an internal one and an external one, connected to a computer allowing the temperature to be monitored and recorded by means of the Spy watch 1.1 software.

The tubes are divided into two groups of two:
At contents of 1% by weight:
  Group 1 (comparative): aqueous mixture+1% by weight of composition A1, relative to the total weight of the aqueous phase
  Group 2 (invention): aqueous mixture+1% by weight of composition B, relative to the total weight of the aqueous phase.
At contents of 3% by weight:
  Group 3 (comparative): aqueous mixture+3% by weight of composition A1, relative to the total weight of the aqueous phase
  Group 4 (invention): aqueous mixture+3% by weight of composition B, relative to the total weight of the aqueous phase.

The tubes thus prepared are placed in a thermostatic bath at a temperature of 20° C. with stirring. The temperature is then lowered to −10° C., which corresponds to a subcooling value of −12° C. At this temperature, Oscillation is maintained for 20 hours (the movement of the balls in the tubes is observed visually) before being stopped. After two hours of stoppage at −10° C., stirring is restarted, and the movement of the balls in the tubes is again observed.

The temperature is then lowered to −20° C. (again at a rate of −1° C. per minute), which corresponds to a subcooling value of −22° C. At this temperature of −20° C., oscillation is maintained for 20 hours before being stopped. After two hours of stoppage at −20° C., stirring is restarted, and the movement of the balls in the tubes is observed visually.

The efficiency of each of the compositions A1 and B was then evaluated visually by observing the movement of the balls in the tubes. If the balls circulate, the test product is efficient. Conversely, if the balls remain blocked, or if hydrate crystals are stuck to the wall of the tube, the test product is not a good anti-agglomerant. The larger the number of blocked balls, the less efficient the product.

c) The Results

The results for each of the groups described above are expressed in the table below:

TABLE 1

| | 1% dosage | | | |
|---|---|---|---|---|
| | Number of balls blocked after 20 hours of stirring | | Number of balls blocked after 2 hours of stoppage | |
| Subcooling value | −12° C. | −22° C. | −12° C. | −22° C. |
| Group 1 (1% of composition A1) | 2/3 | 3/3 | 3/3 | 3/3 |
| Group 2 (1% of composition B) | 0/3 | 0/3 | 0/3 | 0/3 |

TABLE 2

| | 3% dosage | | | |
|---|---|---|---|---|
| | Number of balls blocked after 20 hours of stirring | | Number of balls blocked after 2 hours of stoppage | |
| Subcooling value | −12° C. | −22° C. | −12° C. | −22° C. |
| Group 3 (3% of composition A1) | 1/3 | 3/3 | 2/3 | 3/3 |
| Group 4 (3% of composition B) | 0/3 | 0/3 | 0/3 | 0/3 |

The above results show that the composition according to the present invention (groups 2 and 4) makes it possible to conserve the good anti-agglomerant properties of the compound of formula (I) while at the same time reducing its concentration.

The combination of a nonionic surfactant with a compound of formula (I) thus makes it possible to work at lower temperatures than the current temperatures while at the same time increasing the petroleum and/or gas extraction yield, and limiting the environmental impact of the anti-hydrate, given its low concentration.

II. Second Series of Tests a) The Compositions

The comparative composition (A2) and composition B according to the invention are prepared from the ingredients whose contents are indicated in the table below.

| | Composition A2 (comparative) | Composition B (invention) |
|---|---|---|
| Amphoram CP1-MEG | 50 | 25 |
| Sorbitan monolaurate Span ® 20 | — | 5 |
| Butyl glycol | 50 | 70 | b) The Protocol

The protocol described above is that followed for this second series of tests.

The tubes are divided into two groups of two:

At a content of 1%:

Group 5 (comparative): aqueous mixture+1% by weight of composition A2, relative to the total weight of the aqueous phase Group 2 (invention): aqueous mixture+1% by weight of composition B, relative to the total weight of the aqueous phase.

At a content of 3%:

The tubes are divided into six groups of three:

Group 7 (comparative): aqueous mixture+3% by weight of composition A2, relative to the total weight of the aqueous phase Group 4 (invention): aqueous mixture+3% by weight of composition B, relative to the total weight of the aqueous phase.

c) The Results

The results for each of the groups described above are expressed in the table below:

TABLE 3

| | 1% dosage | | | |
|---|---|---|---|---|
| | Number of balls blocked after 20 hours of stirring | | Number of balls blocked after 2 hours of stoppage | |
| Subcooling value | −12° C. | −22° C. | −12° C. | −22° C. |
| Group 5 (1% of composition A2) | 0/3 | 0/3 | 0/3 | 0/3 |
| Group 2 (1% of composition B) | 0/3 | 0/3 | 0/3 | 0/3 |

TABLE 4

| | 3% dosage | | | |
|---|---|---|---|---|
| | Number of balls blocked after 20 hours of stirring | | Number of balls blocked after 2 hours of stoppage | |
| Subcooling value | −12° C. | −22° C. | −12° C. | −22° C. |
| Group 7 (3% of composition A2) | 0/3 | 0/3 | 0/3 | 0/3 |
| Group 4 (3% of composition B) | 0/3 | 0/3 | 0/3 | 0/3 |

The above results show that the composition according to the present invention (groups 2 and 4) has very good anti-agglomerant properties. Specifically, when compared with the compound of formula (I) alone (i.e. without nonionic surfactant), the composition according to the invention leads to similar results, at lower amounts of active principle.

The combination of a nonionic surfactant with a compound of formula (I) thus makes it possible to work at lower temperatures than the current temperatures while at the same time increasing the petroleum and/or gas extraction yield, and limiting the environmental impact of the anti-hydrate, given its low concentration.

The invention claimed is:

1. A composition, comprising:
(i) at least one compound represented by formula (I) or a salt thereof:

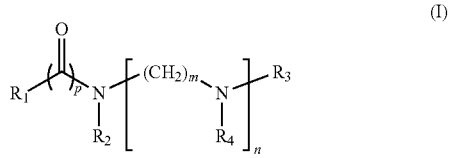

wherein
- $R_1$ represents a linear or branched, saturated or unsaturated $C_6$ to $C_{30}$ alkyl chain, wherein the alkyl chain is optionally interrupted with one or more hydrocarbon-based rings,
- $R_2$ represents a hydrogen atom or a group —(CHR$_a$—CHR$_b$)—COOR$_5$, wherein $R_a$ and $R_b$, which may be identical or different, represent, independently of each other, a hydrogen atom or a methyl group,
- $R_3$ represents a hydrogen atom or a group —(CHR$_a$—CHR$_b$)—COOR$_6$, wherein $R_a$ and $R_b$, which may be identical or different, represent, independently of each other, a hydrogen atom or a methyl group,
- $R_4$ represents a hydrogen atom or a group —(CHR$_a$—CHR$_b$)—COOR$_7$, wherein $R_a$ and $R_b$, which may be identical or different, represent, independently of each other, a hydrogen atom or a methyl group,
- $R_5$, $R_6$ and $R_7$, which may be identical or different, represent, independently of each other, a hydrogen atom or a linear or branched, saturated or unsaturated $C_1$ to $C_{12}$ alkyl chain,
- wherein at least one of the radicals $R_2$, $R_3$ or $R_4$ comprises a carboxylic acid function (—COOH),
- m represents an integer ranging from 1 to 6,
- n represents an integer ranging from 0 to 10, and
- p is 0 or 1; and (ii) at least one nonionic surfactant.

2. The composition of claim 1, wherein
p is 0,
$R_2$ represents a group —(CH$_2$)$_2$—COOR$_5$,
$R_3$ represents a group —(CH$_2$)$_2$—COOR$_6$, and
$R_4$ represents a group —(CH$_2$)$_2$—COOR$_7$,
wherein $R_5$, $R_6$ and $R_7$, which may be identical or different, represent, independently of each other, a hydrogen atom or a linear or branched, saturated or unsaturated $C_1$ to $C_{12}$ alkyl chain, wherein at least one of the radicals $R_5$, $R_6$ and $R_7$ represents a hydrogen atom.

3. The composition of claim 2, wherein $R_5$, $R_6$ and $R_7$ each represent a hydrogen atom.

4. The composition of claim 1, wherein n is an integer ranging from 0 to 4.

5. The composition of claim 1, wherein
n is 0,
p is 0,
$R_1$ represents a linear or branched, saturated or unsaturated $C_8$ to $C_{18}$ chain,
$R_2$ represents a hydrogen atom, and
$R_3$ represents a group —(CHR$_a$—CHR$_b$)—COOR$_6$, wherein $R_a$ and $R_b$, which may be identical or different, represent, independently of each other, a hydrogen atom or a methyl group, and wherein $R_6$ represents a hydrogen atom.

6. The composition of claim 1, wherein the nonionic surfactant is chosen from esters formed from alcohols and/or alkoxylated alcohols and from linear or branched, saturated or unsaturated $C_8$ to $C_{30}$ acids, alkoxylated fatty acids, and alkoxylated fatty alcohols.

7. The composition of claim 1, wherein the nonionic surfactant is selected from the group consisting of sorbitan monolaurate, sorbitan monopalmitate, sorbitan monostearate, sorbitan monooleate, sorbitan sesquioleate, sorbitan trioleate, sorbitan isostearate, and mixtures thereof.

8. The composition of claim 1, wherein the total amount of the nonionic surfactant ranges from 0.5% to 15% by weight, relative to the total weight of the composition.

9. The composition of claim 1, wherein the total amount of the nonionic surfactant ranges from 1% to 10% by weight, relative to the total weight of the composition.

10. The composition of claim 1, wherein the nonionic surfactant comprises at least one of sorbitan monolaurate and sorbitan monostearate.

11. The composition of claim 1, wherein the compound represented by formula (I) is in the form of a salt.

12. The composition of claim 1, wherein the nonionic surfactant is an ester, alkoxylated fatty acid or an alkoxylated fatty alcohol.

13. The composition of claim 1, further comprising at least one additive.

14. The composition of claim 1, further comprising at least one additive selected from the group consisting of anticorrosion agents, anti-paraffins, mineral deposit inhibitors, anti-asphaltenes, de-emulsifiers, and surfactants.

15. A method of preparing the composition of claim 1, comprising combining (i) and (ii).

16. A process for limiting or preventing the formation and/or agglomeration of gas hydrates, comprising combining (1) the composition of claim 1 and (2) a production fluid comprising an aqueous phase and one or more gases.

17. The process of claim 16, wherein the composition is combined with the production fluid in an amount ranging from 0.1% to 10% by weight, relative to the weight of the aqueous phase of the production fluid.

* * * * *